No. 804,605. PATENTED NOV. 14, 1905.
G. G. JACKSON.
VEHICLE WHEEL.
APPLICATION FILED MAR. 28, 1905.
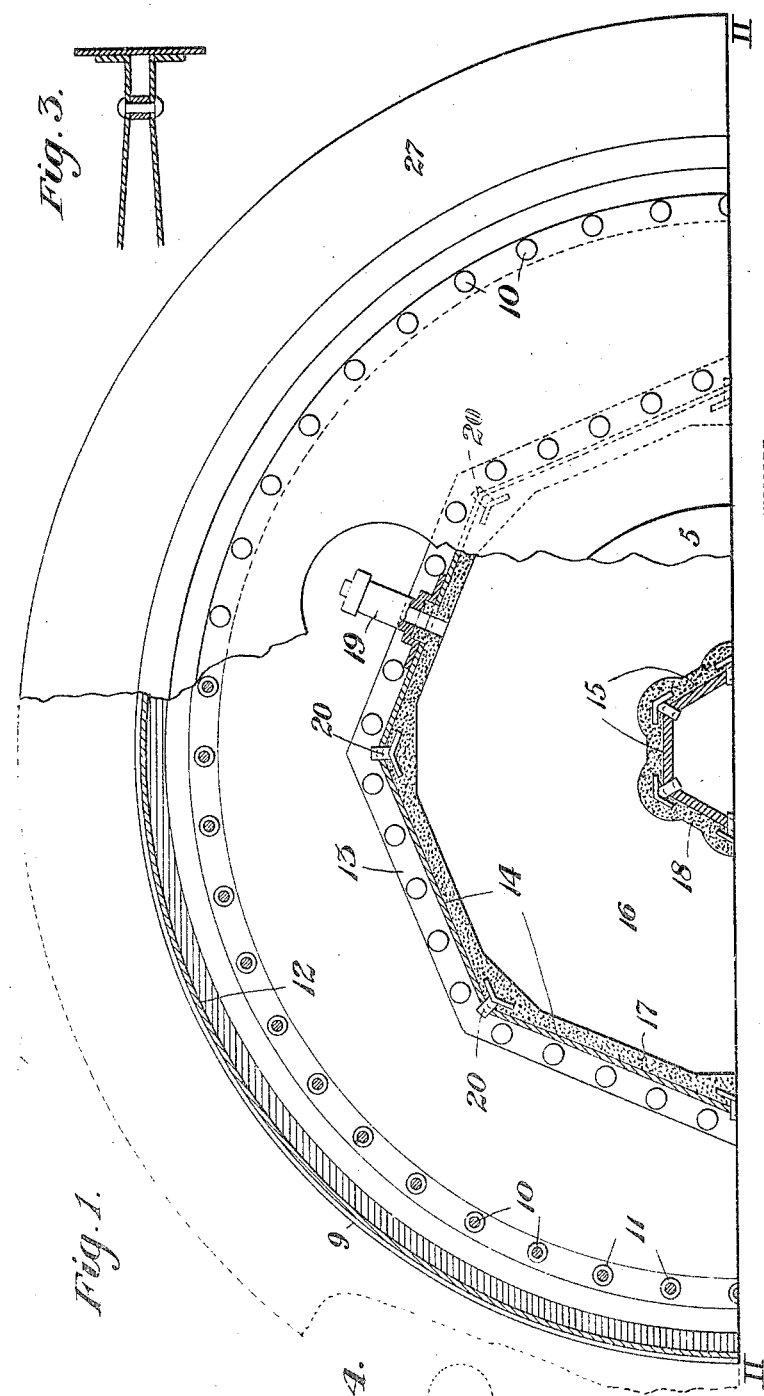
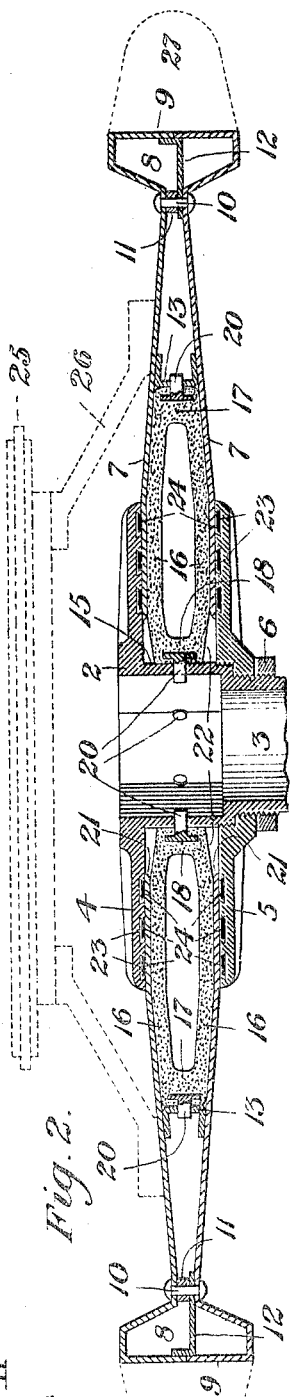
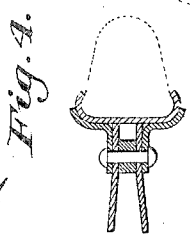

UNITED STATES PATENT OFFICE.

GUY GARFIELD JACKSON, OF ALLEGHENY, PENNSYLVANIA.

VEHICLE-WHEEL.

No. 804,605.            Specification of Letters Patent.            Patented Nov. 14, 1905.

Application filed March 23, 1905. Serial No. 252,457.

*To all whom it may concern:*

Be it known that I, GUY GARFIELD JACKSON, a citizen of the United States, residing at Allegheny, in the county of Allegheny and State of Pennsylvania, have invented certain new and useful Improvements in Vehicle-Wheels, of which the following is a specification, reference being had therein to the accompanying drawings, forming part of this specification, in which—

Figure 1 is a side elevation, partly in section, of my improved cushion vehicle-wheel. Fig. 2 is a longitudinal section thereof on the line II II of Fig. 1. Figs. 3 and 4 are detail views showing modifications.

My invention relates to improvements in vehicle-wheels, more particularly that class of wheels used for automobiles and similar vehicles; and the object of the invention is to provide a wheel having a solid tire with an inflatable cushion intervening between the hub and tire or tread portion of the wheel.

Generally stated, the invention consists of a central hub portion and an outer concentric body portion relatively movable with relation to the hub and provided with a peripheral tire with an intervening cushion, preferably inflatable, adapted to normally hold the wheel proper in concentric relation to the hub or axle center, but to permit of considerable relative movement due to the load, inequalities in the road, &c.

Referring to the drawings, wherein the invention is illustrated, 2 represents the hub, provided with a tubular extension 3, preferably integral and adapted to be incorporated with any suitable axle bearing or skein, so as to provide free rotative movement. The hub is provided with a peripheral flange 4 at one side, also preferably integral, and a similar flange 5, secured upon the hub by threaded engagement, as shown, a lock-nut 6 being preferably employed to hold the flange against loosening. The wheel proper consists of a disk composed of oppositely-arranged sheet or plate metal sides 7 7, the inner portions of which are parallel and adapted to be embraced between the flanges 4 5, the outer portions of the sides preferably tapering toward the rim 8, which is formed by bending the disks abruptly outwardly, as shown, so as to provide a flat tire-base 9. In the construction shown in Fig. 2 of the drawings the base is made integral with the sides 7; but it is obvious that other forms of construction may be adopted so as to provide a similar result, as by separately connecting the base, as shown in Fig. 3. In the integral construction the sides are connected at intervals by a circularly-arranged series of rivets 10 with intervening spreaders or washers 11, while a bracing-plate 12 is also held by the rivets 10 between the sides and extends outwardly into abutting contact with the meeting edges of the bases 9, thereby strengthening and reinforcing the base.

Between the outer peripheral circumference of the wheel and the hub portion, at any suitable point, dependent upon the size of the wheel, the conditions of service, &c., is located a concentric bracing-spreader 13, riveted to the sides 7, as shown, and providing an inner backing for the outer periphery of the inflatable cushion. For the purpose of insuring a non-rotatable engagement therewith of the cushion and preventing relative movement of these parts the spreader 13 is made in polygonal form, as octagonal, thereby providing a series of connected flat faces 14, against which the corresponding flat faces of the inflatable cushion will bear. For the same purpose the exterior of the middle portion of the hub 2 is likewise made in polygonal form, as hexagonal, providing a series of connected flat faces 15, which provide a bearing for the inner correspondingly-shaped central portion of the inflatable cushion. The cushion, which is interposed between the bracing-spreader 13 and the hub, consists of a hollow body, preferably of rubber, having oppositely-located side walls 16 16, an outer rim 17, and an inner rim 18, said outer and inner rims being molded to conform to the flat faces of the bracing-spreader and hub, respectively. The cushion is provided with an inflating valve-controlled connection 19, a suitable opening being left in the side of one of the plates 7 for making attachment with a source of air-pressure, by which means the cushion is inflated to the desired degree. For the purpose of more positively connecting the cushion with the bracing-spreader and hub, respectively, so as to prevent rotation, the inner and outer rims are provided with interlocking abutments or pins 20 of any suitable construction having heads embedded in the substance of the cushion with projecting terminals adapted to engage in suitable recesses in the spreader and hub, as clearly shown, and by this construction these interlocking devices coöperate with the other portions and effectually prevent rotation of the wheel-disk independent of the hub.

The inner parallel side portions of the disk 7 are embraced between the flanges 4 and 5, as shown, and are preferably rounded on their inner side edges, as indicated at 21, so as to prevent pinching or cutting of the cushion due to movement of the wheel, and the cushion itself is also preferably tapered inwardly toward the central opening, as indicated at 22, to insure clearness, while providing for spreading of the cushion under excessive pressure. For the purpose of preventing friction and of insuring an easy working joint throughout the interior faces of the hubs they are provided with concentrically-arranged channels 23, preferably of dovetail form, to hold the packing, in which channels are secured packing-washers 24, of felt, graphite, or other suitable material or substance, which may, if desired, be saturated with oil or grease, so as to provide sufficient lubrication, and these elements materially facilitate the easy working of the device.

If it is desired to attach driving mechanism to the wheel, the attachment is preferably made with the wheel-disk portion beyond the hubs, as indicated in dotted lines in Fig. 2, wherein a sprocket-wheel 25 is secured to the disk beyond the hubs sufficiently far to prevent interference by means of spanner-arms 26. By this construction the power is transmitted directly to the traction-wheel, relieving the hub of all strain, although ordinarily in the running wheels of the vehicle this torsional strain will not exist, the wheel acting merely to support the working load.

In action the weight of the carriage will be transmitted to the supporting-wheel disks through the intervening cushions, which will be more or less compressed, and it will be understood that the diameter of the cushion, thickness of its walls, and the pressure of the contained air will be adjusted to suit the conditions of use. It will be observed that the cushion is well protected from injury or puncture, while it entirely obviates the necessity of employing a pneumatic tire, thus avoiding the various objections and injuries to which such tires are subject.

The tire proper, 27, may be of any suitable form, construction, or material and secured upon the rim of the wheel in any suitable or desired manner within the judgment of the builder or designer. The wheel is capable of application to various uses. It may be greatly modified or changed to suit the requirements of use as to size, design, or various other features or details by the skilled mechanic; but all such changes are to be considered as within the scope of the following claims.

Having described my invention, what I claim is—

1. In a vehicle-wheel, the combination with a hub having a polygonal exterior and an embracing-flange, of a corresponding adjustable flange, an outer wheel composed of disks located between said flanges and provided with internal polygonally-arranged cushion-bearing elements, and a compressible cushion having inner and outer polygonally-arranged faces adapted to bear against the hub exterior and said wheel-bearings, substantially as set forth.

2. In a vehicle-wheel, the combination with a hub and an outer wheel, of an intervening compressible cushioning device provided with embedded holding devices adapted to engage the hub and wheel so as to prevent relative rotation of the parts, substantially as set forth.

3. In a vehicle-wheel, the combination with a hub and an outer wheel relatively movable thereto and provided with an interior cushion-bearing portion; of an intervening compressible cushioning member having embedded holding devices adapted to engage the hub and said inner bearing portion respectively so as to prevent relative rotation of the parts, substantially as set forth.

4. In a vehicle-wheel, the combination with a hub and an outer wheel relatively movable thereto and provided with an interior cushion-bearing portion; of an intervening compressible cushioning member provided with a series of embedded abutments adapted to engage the hub and outer wheel for preventing relative rotative movement of said parts, substantially as set forth.

5. In a vehicle-wheel, the combination with a hub having a polygonal exterior and an outer wheel having a polygonal interior bearing portion; of an intervening cushioning member provided with faces adapted to engage the faces of the said hub and wheel bearing portion respectively, with supplemental devices incorporated with said cushioning member adapted to engage the hub and bearing portion respectively, substantially as set forth.

6. In a vehicle-wheel, the combination with a hub having a polygonal exterior and an embracing-flange; of an adjustable flange, an outer wheel composed of disks located between said flanges, inner bearing-rings inserted in the flanges, and a compressible cushion intervening between the hub and said wheel, substantially as set forth.

In testimony whereof I affix my signature in presence of two witnesses.

GUY GARFIELD JACKSON.

Witnesses:
R. H. JACKSON,
C. M. CLARKE.